Aug. 7, 1956

A. K. VELAN 2,757,870

PISTON STEAM TRAP

Filed Dec. 3, 1953

Inventor
Adolf Karel Velan
By Alan Swabey
Attorney

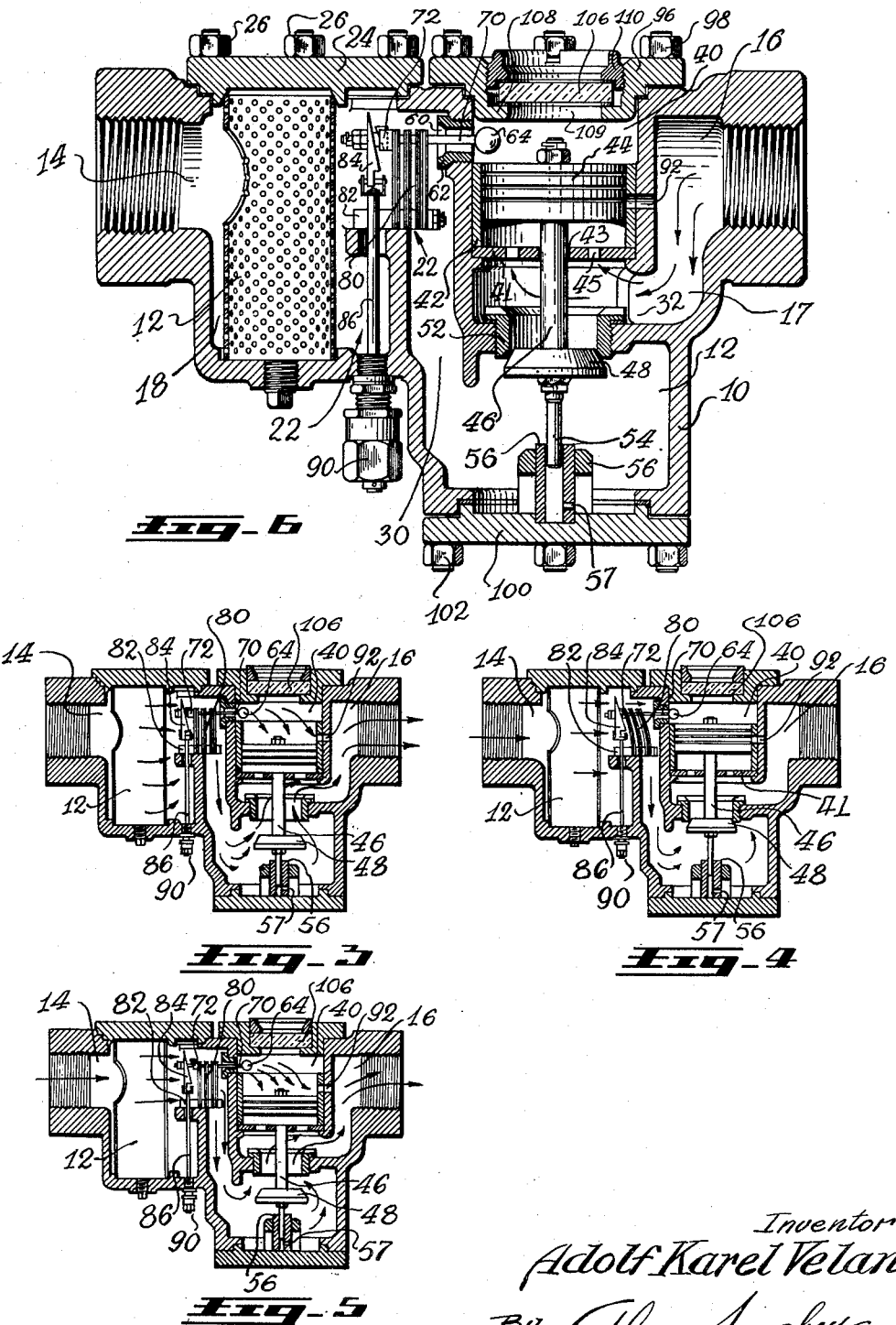

United States Patent Office 2,757,870
Patented Aug. 7, 1956

2,757,870
PISTON STEAM TRAP
Adolf Karel Velan, Montreal, Quebec, Canada
Application December 3, 1953, Serial No. 395,896
4 Claims. (Cl. 236—54)

Introduction

The present invention relates to improvements in devices for controlling the air venting and condensate draining of steam.

In steam installations, for example those used in processing industries, heating plants and the like where saturated steam or super heated steam is employed as the heating medium, it is necessary to provide various automatic devices so that air will be discharged from the systems during the initial heating up from cold condition, condensed steam will be discharged from the system without loss of live steam and the back flow of condensate prevented. Normally, separate devices are used for each operation, for example, steam traps are provided for the automatic discharge of condensed steam, air vents of various types and designs are used for the automatic discharge of air from the systems during the heating up period, and check valves of various types and descriptions are installed in front of the discharging side of the steam traps to prevent possible back flow of condensate from return lines of adjoining equipment.

At the present time, apparatus to overcome these problems is available in the form of a universal steam trap as is set forth in the applicant's United States Patent 2,629,553, February 24, 1953. This steam trap utilizes a bimetallic element of special design to control the movements of a free floating valve so that a single unit is capable of taking care of the initial heating up condition, the discharging of condensed steam and preventing the back flow of condensate.

While this steam trap is suitable for the purpose for which it was designed, there was the need for an improved steam trap of this nature which could handle extremely large amounts of condensates quickly. For example, large amounts of condensates have to be handled quickly for the automatic airventing and condensate draining of steam purifiers, headers, heaters, de-superheaters, digesters, flash-tanks, continuous blow-down systems, evaporators of many designs, and processing equipment in sugar mills, breweries, etc. Accordingly, the present invention aims to provide an improved steam trap design wherein certain of the features of the applicant's Universal Steam Trap as set forth in U. S. Patent 2,629,553 are combined in a piston operated steam trap which is capable of handling extremely large amounts of condensates and at high pressures.

With this in mind, the invention comprises a piston operated steam trap which contains within a single casing or body all the necessary elements for the automatic airventing condensate draining, and prevention of backflow condensates in a steam system where extremely large amounts of steam condensate have to be handled quickly. A preferred construction of the present steam trap includes a main body or casing which has an internal recess forming a fluid chamber with openings provided at opposite ends of said body to constitute fluid inlet and outlet passages leading to and from the chamber. A main control valve is mounted in the body to control the passage of fluid through the fluid chamber between the inlet and outlet passages. This main valve includes a valve seat mounted in the passage from the fluid chamber and a valve head that is adapted to be engaged with the seat. The valve head is supported by a valve stem which is also connected to a piston. The piston is mounted for sliding reciprocal movement within a further recess formed within the body so as to constitute a cylinder.

The cylinder is provided with a bearing sleeve to guide the piston and with a first opening or port leading into the inlet passage and second and third ports diametrically opposed to the first port leading into the outlet passage. A valve seat is provided in the first port and a pilot valve, including a valve head adapted to be seated on the valve seat, is mounted in the path of the fluid entering from the main body inlet opening. The pilot valve arrangement employed in the preferred construction includes a bimetallic element which is responsive to fluctuations in fluid temperature.

With this arrangement, on starting up, when air initially enters through the inlet opening of the trap, the pilot valve allows air to be discharged under pressure through the first port against the head of the piston which has an area greater than that of the main valve head. This forces the piston down, opening the main valve for blast discharge of air and water.

When the steam enters the inlet passage, it first contacts the bimetallic element forming part of the pilot valve so as to actuate the pilot valve head into closed position on the seat provided on the first port of the cylinder so that the pressure above the piston is relieved through the second of the cylinder ports leading into the discharge outlet. The pressure of the steam acting on the main valve forces the piston upwards closing the main valve.

When water through condensate flows through the inlet opening and fills the fluid chamber, the bimetallic element controlling the pilot valve releases the pilot valve head and water under pressure is allowed to pass through the first port into the cylinder to act against the head of the piston so as to force it downward and open the main valve. When the main valve is wide open the second port into the discharge outlet is uncovered reducing pressure above the piston and prevents excess piston travel. The valve normally remains in this balanced position until the condensate discharge is completed.

If the pressure in the return line leading from the discharge outlet is higher than the normal steam pressure due to sudden line pressure drops or rapid fluctuations, the back pressure fluid will enter through the third cylinder port and act against the bottom of the piston, which has an area larger than that of the main valve, and therefore will force the piston upwards closing the main valve.

In the preferred construction, means are also provided for the initial straining of the fluid as it enters into the inlet passage and a flow control glass is provided with a special feature that allows complete visibility of flow conditions. This is disposed so that the fluid within the main fluid chamber can be viewed as it passes from the inlet passage into the fluid chamber. Means are also provided so as to measure the temperature of the condensate during discharge.

Detailed description

Having thus generally described the nature of the invention, particular reference will be made to the accompanying drawings, wherein there is shown by way of illustration a preferred embodiment thereof and in which:

Figure 3 is a cross sectional view of a steam trap construction shown in Figures 1 and 2 to illustrate in more detail the internal construction and the condition of the piston and pilot valve during the heating up or air-discharge cycle.

Figure 4 is a sectional view corresponding to Figure 3 showing the relative position of the pilot valve and piston under the influence of high pressure steam with the bimetallic element of the pilot valve shown in operative condition.

Figure 5 is a sectional view corresponding in location to Figures 3 and 4 showing the valve and the position it will adopt during condensate discharge.

Figure 6 is an enlarged view in section corresponding to Figures 3, 4 and 5 showing the relative position of the various elements when the trap is functioning to prevent back pressure from the return line.

Figure 1:
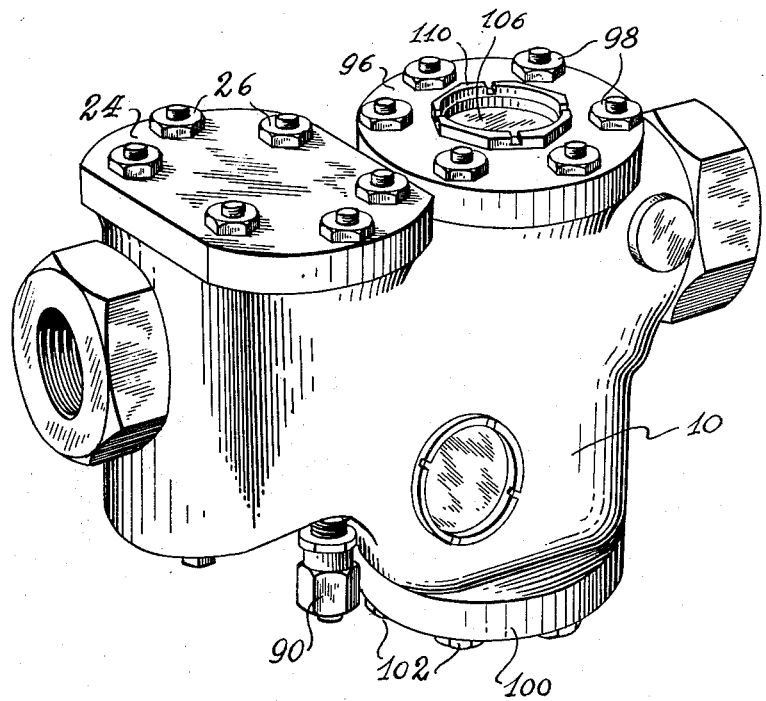
Figure 1 is a side view in perspective elevation of a piston operated steam trap in accordance with the invention.
Figure 2:
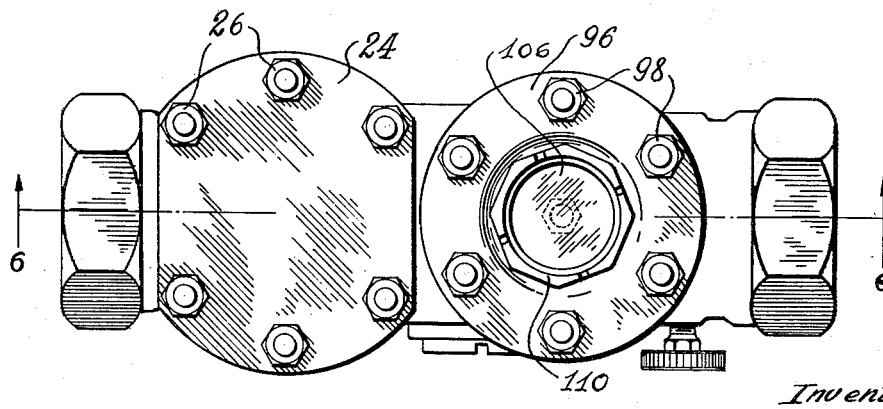
Figure 2 is a plan view of the construction shown in Figure 1.

With particular reference to Figures 1, 2, and 6 of the drawings, a piston operated steam trap constructed in accordance with the present invention is shown as comprising of a main outer body or casing 10 having a first internal recess 12 constituting a fluid chamber and further recesses forming opposed passages 14 and 16 leading into the body at opposite ends and constituting inlet and outlet fluid passages respectively. The inlet passage 14 passes into an enlargement 18 formed directly in the body 10 with the first or fluid entry portion being tapped internally to provide a means of connection to a piping system. The enlargement 18 is adapted to house a strainer 20 and a pilot valve arrangement 22 which will be described in more detail later. Access is provided to the enlargement 18 through a cover plate 24 secured to the main body 10 by studs and bolts 26. The inlet passage continues through the enlargement 18 down through a channel 30 directly into the fluid chamber 12.

The outlet passage 16 includes a fluid entry portion suitably tapped for connection to the piping system and a further portion 17 extending downwardly and inwardly in an offset direction from the opening to lead directly into a port 32 in the side wall of a cylinder 40.

The cylinder 40 is constituted by a cylindrical recess provided within the body 10 and is disposed substantially centrally of and in substantial axial alignment with the fluid chamber 12. The cylinder 40 is provided with a cylindrical lining or sleeve 42 and a circular plate 41, provided with a central opening 43 and spaced apart fluid passage openings 45, is mounted transversely across the cylinder 40 beneath the sleeve 42. A piston 44 is slidably mounted within the sleeve 42 so as to be adapted for sliding reciprocal movement relative thereto. The piston 42 is connected directly to a stem 46 which extends through the opening 43 of the plate 41 with the lower end connected to a main valve head 48. The valve head 48 is adapted to seat on a valve seat 50 threaded into the lower portion of the cylindrcial recess forming the cylinder 40. The valve head 48 is also provided with an extension 54 in axial alignment with the stem 46 and on the outer surface of the valve head opposed from the stem 46. The extension 54 is slidably engaged with a cylindrical bearing sleeve or guide 56 mounted on the bottom of and extending upwardly from the fluid chamber 12. The guide 56 maintains the extension 54 and consequently the valve head 48 in axial alignment during its reciprocal movement and also acts to dampen any oscillations of the valve head 48 due to fluctuations in pressure. An opening 57 is provided in the side wall of the guide 56 to allow liquid accumulating in the guide 56 to escape. With this arrangement the piston 44 and consequently the valve head 48 is supported for 'free floating" movement relative to the cylinder sleeve 42 and the valve seat 50. The cylinder 40, in addition to the discharge port 32 adjacent the lower end, is also provided with an entry port 60 which leads directly into the enlargement 18 of the fluid inlet passage 14. A valve seat 62 is threadably mounted in the port 60 so as to provide a seat for a valve head 64 extending from a bimetallic controlled valve arrangement of a type similar to that shown in the applicant's U. S. Patent No. 2,629,553 as previously mentioned.

This valve arrangement consists essentially of a free floating valve stem 70 which is supported by a rocker member 72 so that the valve head 64, preferably of the spherical form as shown, is disposed within the cylinder 40 and adapted to seat against the valve seat 62. The valve stem 70 is mounted for free sliding movement, relative to the rocker arm support 72, under the influence of fluid at low temperatures. When the bimetallic elements 80 come into play under contact with high temperature fluids, their deflection acts against the rocker arm 72, and through the valve stem 70, brings the valve head 64 into seated position.

The bimetallic plates 80 are mounted on a supporting standard 82 and adjusting means in the form of a pivotally mounted wedge member 84, mounted on a rotatable shaft 86, are provided so that clearance between the valve head 64 and the valve seat 62 can be adjusted. This adjustment can be made externally as the rotatable rod 86 extends to the exterior of the body 10 through a special gland arrangement so that adjustment can be made through an adjusting nut 90. The exact construction and operation of this bimetallic pilot valve is described in complete detail in the applicant's U. S. Patent 2,629,553.

A further discharge port 92 is provided through the wall of the cylinder 40 so as to lead into the discharge outlet 16. The discharge port 92 extends through the partitioning wall baffling the discharge passage 16 and through the sleeve 42.

Access to the cylinder 40 is provided by a cover plate 96 secured to the body 10 by studs and bolts 98. Access is also provided to the lower portion of the fluid chamber 12 by a cover plate 100 secured by studs and nuts 102. The cover 96 is provided with a sight glass 106 seated in a centrally located depression 108 having a central opening 109, the sight glass 106 being retained in position by the threaded engagement of an annular cover 110 in the depression 108.

The main body 10 is also provided with a second control glass 112 mounted in the side of the body 10 so as to provide an interior view of the fluid chamber 12 adjacent the end of the fluid entry passage 30. The control glass 112 and the sight glass 106 are made from special borosilicate, thermal and pressure shock-proof glass to withstand pressures up to 650 p. s. i. and 770° F. By affording this means of viewing the interior of the trap, a positive control of steam operations is achieved and dangerous corrosion discovered in time.

In operation, the present piston operated trap discharges air as efficiently as water. The valve head 64 of the bimetallic controlled pilot valve discharges air under pressure through the port 60 against the head of the piston 42 which has an area much greater than that of the main valve 48 connected to the stem 46. The difference between the two forces pushes the piston downwards and, through the stem 46, opens the valve head 48 to allow for blast discharging of air and water when the steam is first turned on—see Figure 3. The unrestricted area of the valve seat 52 which, in the preferred construction is in the order of 2" in diameter, assures a tremendous rapid discharge of air, not possible through prior art steam traps of this nature.

When steam enters the main body 10 through the inlet passage 14, once it has passed through the filter 18 it contacts the bimetallic elements 80 of the pilot valve so as to actuate the valve head 64 against the valve seat 60, closing the cylinder port 60 of the cylinder 40. The pressure above the piston is reduced through the smaller relief exhaust port 92 leading into the discharge opening 16 and to the return line. The pressure of the steam passing through the plate 41 and acting now on the under surface of the piston 42 moves the piston upwards relative to the cylinder sleeve 42 closing the main valve tightly against the steam. The continued pressure against the valve head 48 maintains the valve in closed position under normal conditions. This operation of the trap is shown in Figure 4. The trap can be so adjusted through the adjustable member of the pilot valve bimetallic element so that the trap will close on hot water only if so desired.

When water from condensate fills or partially fills the fluid chamber 12 and the enlargement 18, the thermal pull of the bimetallic element of the pilot valve, through the reduction in temperature, is released and the valve head 64, due to its free-floating mounting is opened. The water then passes through the port 60 against the upper surface of the head of the piston 44 in a similar manner as was performed by the air discharge so that the piston is pushed downwards and opens the main valve 48, opening the trap to full capacity instantly. The opening of the main valve uncovers the secondary relief exhaust port 92 so that pressure is reduced above the piston and prevents excess piston travel. The piston, and consequently the valve head 48, remains in this balanced position, as shown in Figure 5 until the last of the water is discharged.

If the pressure in the return line for any reason is higher, due to sudden line pressure drops or rapid fluctuations of pressure, the valve will close automatically to prevent back flow. The higher return pressure acts through the discharge outlet passage portion 17 and the larger discharge port 32 against the bottom of the piston and it is therefore forced upwards closing the valve immediately.

The adjustment of the trap can be made through the bimetallic element control member 90 by decreasing and increasing the clearance of the pilot valve head in cold condition. If the trap leaks steam, the turning of the controller nut 90 to the right and pushing the wedge downwards will reduce steam leaks. The backing up of condensate will be checked by turning the adjusting nut in the reverse direction, moving the adjusting wedge upwards and increasing the clearance of the valve head of the pilot valve in cold condition.

It will be understood that the piston operated steam trap in accordance with the present invention is capable of handling tremendous amounts of condensate up to approximately 300,000 lbs. per hour for 200 lbs. steam pressure.

I claim:

1. A piston operated steam trap, comprising in combination, a main body having an internal recess forming a fluid chamber, fluid and inlet passages in said body leading to and from said chamber, a main valve mounted in said body adapted to control the passage of said fluid through said inlet and outlet passages, said valve including a valve seat and a valve head adapted to engage said seat, a valve stem connected to and extending from said valve head, a further recess within said body between and in substantial alignment with said inlet and outlet passages forming a cylinder, a piston mounted for sliding movement within said cylinder and being connected to said valve stem, a baffle plate including inlet and outlet fluid ports and a central opening adapted to slidably accommodate said valve stem disposed diametrically across the lower end of said cylinder, said cylinder having a first port leading into said inlet passage and second and third ports leading into said outlet passage, said first, second and third ports being disposed in spaced apart relationship along the axial length of said cylinder, said first and second ports leading directly into said cylinder above said baffle plate, said third port being of considerably greater area than said first and second ports and leading from the area of said cylinder beneath said baffle plate into direct communication with said outlet passage, a valve seat in said first port within said cylinder, a pilot valve including a valve head disposed within said cylinder and adapted to engage with said valve seat and a valve stem loosely fitting through said first port and extending exteriorly of said cylinder, and temperature responsive means disposed within said fluid chamber in alignment with said fluid inlet passage and being adapted to act on said valve stem, whereby entry of fluid into said body fluid chamber under low temperature conditions is adapted through said pilot valve controlled first port to enter said cylinder to act against said piston thereby to place said main valve in open condition, the entry of fluid into said body fluid chamber in relatively higher temperature conditions being adapted through said temperature responsive means to actuate said pilot valve to close said first cylinder port and place said main valve in closed condition.

2. A piston-operated steam trap as claimed in claim 1, wherein said piston has a greater effective area than said main valve head.

3. A piston-operated steam trap as claimed in claim 1, wherein said temperature responsive means acting on said pilot valve stem is a bimetallic element.

4. A piston-operated steam trap as claimed in claim 1, wherein said main valve head is provided with an extension opposed to and in axial alignment with said valve stem with the outer end of said extension slidably mounted in a support provided within said fluid chamber, said support being in axial alignment with said cylinder recess and said valve stem.

References Cited in the file of this patent

UNITED STATES PATENTS

| | | |
|---|---|---|
| 688,283 | Bickel | Dec. 10, 1901 |
| 1,033,542 | Collin | July 23, 1912 |
| 1,734,816 | Ludwig | Nov. 5, 1929 |
| 2,029,203 | Soderberg | Jan. 28, 1936 |